(12) United States Patent
Kuntz

(10) Patent No.: US 6,896,013 B2
(45) Date of Patent: May 24, 2005

(54) AIRCRAFT DEFUELING APPARATUS AND METHOD

(75) Inventor: James P. Kuntz, Spokane, WA (US)

(73) Assignee: Spokane Industries, Inc., Spokane, WA (US)

( * ) Notice: Subject to any disclaimer, the term of this patent is extended or adjusted under 35 U.S.C. 154(b) by 0 days.

(21) Appl. No.: 10/690,304

(22) Filed: Oct. 21, 2003

(65) Prior Publication Data

US 2005/0081949 A1 Apr. 21, 2005

(51) Int. Cl.$^7$ ................................................ B65B 1/04
(52) U.S. Cl. ........................... 141/65; 141/231; 141/98; 184/1.5
(58) Field of Search ............................. 141/1, 7, 8, 65, 141/98, 231, 351, 367, 383; 184/1.5; 285/23, 24, 9.2; 251/149.8, 144

(56) References Cited

U.S. PATENT DOCUMENTS

| | | | |
|---|---|---|---|
| 4,883,102 A | * 11/1989 | Gabrielyan et al. | ............ 141/98 |
| 5,117,876 A | 6/1992 | Kuntz | ............................. 141/7 |
| 5,492,144 A | * 2/1996 | Kriewaldt | .................... 137/205 |
| 5,878,799 A | * 3/1999 | Hannick | ...................... 141/351 |

* cited by examiner

Primary Examiner—Steven O. Douglas
(74) Attorney, Agent, or Firm—Holland & Hart

(57) ABSTRACT

A method and apparatus for defueling an aircraft. The apparatus includes a defueling fitting comprising one or more structural connectors, which may include one or more suction cups. The one or more structural members are attached to a mount. The mount may be of any shape, including generally straight, angled, polygonal, or circular. An actuator assembly is attached to the mount for opening an aircraft defueling valve. The first and second suction cups are operatively connected to a vacuum source to connect the defueling fitting to an aircraft body, with the actuator assembly positioned at the aircraft defueling valve. The defueling fitting facilitates safe and convenient defueling of certain aircraft that have recessed or covered fuel drain valves. For example, the Boeing C-17 has fuel drain valves that are recessed behind doors, heretofore presenting a great obstacle to appropriate defueling. The defueling fitting described herein may be used in small and tight spaces, even when other conventional defueling fittings are not helpful.

40 Claims, 4 Drawing Sheets

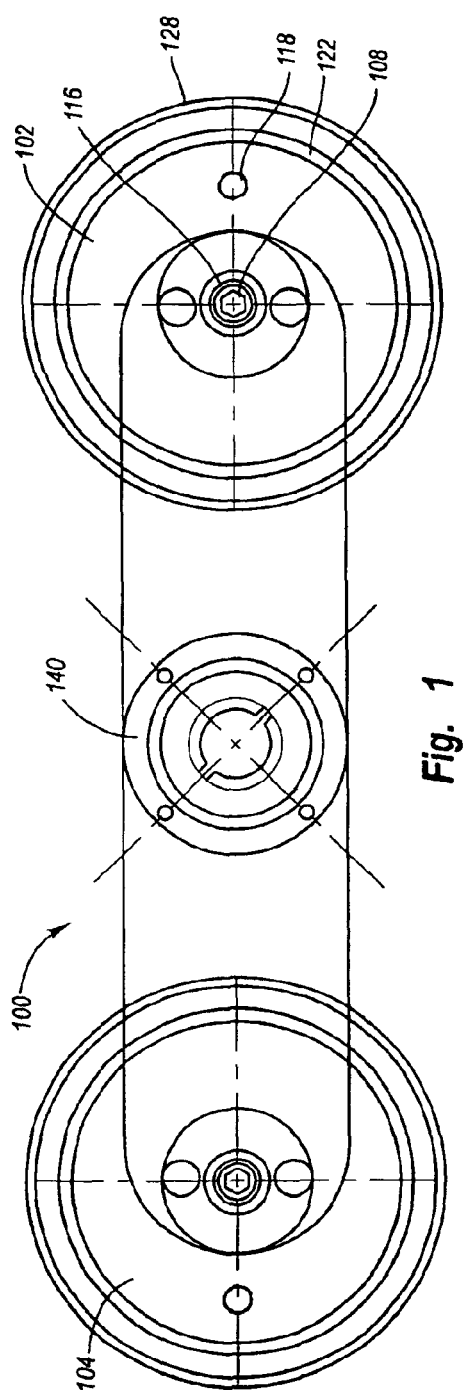
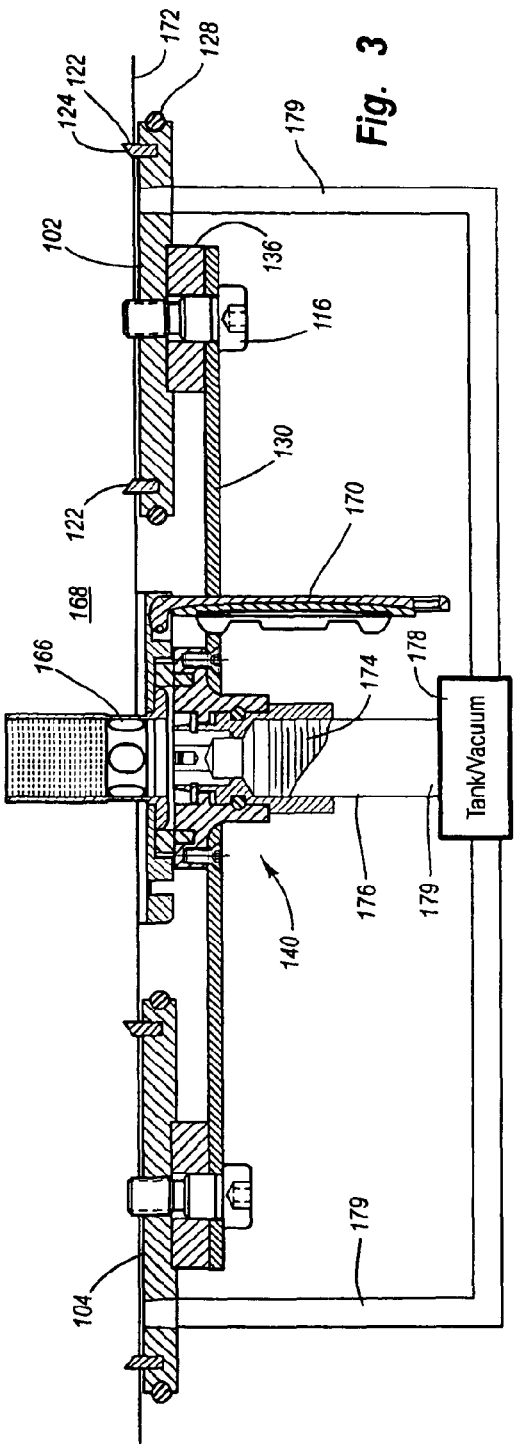

AIRCRAFT DEFUELING APPARATUS AND METHOD

FIELD OF THE INVENTION

The present invention relates to aircraft equipment, and more particularly to a method and apparatus for defueling an aircraft.

BACKGROUND OF THE INVENTION

Generally, aircraft often need to be defueled prior to performing certain types of maintenance or repairs. There are generally three stages of aircraft defueling: pumping (removing the majority of fuel from the aircraft fuel cells), bottom sumping (removing most of the remaining fuel from the bottom of the fuel cells—traditionally done by some type of gravity feed), and depuddling (which involves removing the small puddles remaining in the fuel cells). A number of aircraft defueling systems have traditionally been available to handle the various stages of aircraft defueling. At some point, however, most defueling systems require some type of gravity feed, resulting in low drain rates and long drain times. In fact, for many large aircraft, depending on the amount of fuel remaining in the tanks, it can take up to several hours to fully defuel the aircraft using a gravity dependent system.

More recent defueling systems include a vacuum assist to increase the defueling rate. Vacuum assist defueling systems can evacuate airplane fuel tanks in a fraction of the time normally allocated to a gravity system. Nevertheless, many vacuum assist systems are useful only with specific fuel drain configurations. Thus, the use of such vacuum assist systems is limited to certain aircraft and certain personnel trained to match an inventory of attachments with the design requirements of fuel drain systems of particular aircraft.

Accordingly, a universal coupler described in U.S. Pat. No. 5,117,876 ("the '876 patent), which is incorporated in its entirety herein by this reference, is intended for use with nearly all aircraft. However, certain aircraft, such as the Boeing C-17, include a door housing the fuel drain valve. The location of the door and the recessed valving prevents use of a universal coupler similar to what is shown and described in the '876 patent. The spacing about the door on the C17 is generally too small to accommodate the universal coupler of the '876 patent. Therefore, there is a need for an aircraft defueling apparatus that can be used in a variety of environments, including relatively small, enclosed spaces, to minimize the risk of fuel leaks.

SUMMARY OF THE INVENTION

The present invention provides a method and apparatus for defueling aircraft. The apparatus includes a defueling fitting comprising one or more structural connectors, which may include suction cups. The one or more structural members are attached to a mount. The mount may be configured in any desired shape, including a shape that is generally straight, angled, polygonal, or circular. An actuator assembly is attached to the mount for opening an aircraft drain valve. The first and second suction cups are operatively connected to a vacuum source to create a pressure differential for connecting the defueling fitting to an aircraft body, with the actuator assembly operatively positioned at the aircraft drain valve.

The defueling fitting facilitates safe and convenient defueling of certain aircraft that have unique configurations, such as recessed or covered fuel drain valves. For example, the Boeing C-17 has fuel drain valves that are recessed behind doors, heretofore presenting a great obstacle to safely defueling. The defueling fitting described herein may be used in small and tight spaces, even when other conventional defueling fittings are not helpful.

Other objects, features, and advantages of the invention will become apparent from the following detailed description of the invention with reference to the accompanying drawings.

BRIEF DESCRIPTION OF THE DRAWINGS

Preferred embodiments of the invention are described below with reference to the accompanying drawings:

FIG. 1 is a bottom view of an aircraft defueling fitting according to one embodiment of the present invention;

FIG. 3 is a side elevation view, partly in section, of the aircraft defueling fitting of FIG. 1 attached to a surface of an aircraft, and shown in schematic representation in relation to a tank and vacuum according to one embodiment of the present invention;

Throughout the drawings, identical reference numbers and descriptions indicate similar, but not necessarily identical elements.

DETAILED DESCRIPTION OF THE INVENTION

It is a very common procedure to defuel an aircraft prior to maintenance or repair. Most aircraft include one or more drain valves at low points of the fuel tanks to facilitate defueling. The drain valves are usually spring loaded "poppet" valves that are opened by the application of a force normal to the spring force. The drain valves of most aircraft are flush with the outside body of the aircraft and therefore readily accessible with few or no local obstructions. However, some aircraft include recessed fuel drain valves that are more difficult to access. Some recessed fuel drain valves are located adjacent or behind structures, such as doors, that are generally flush with the outside body of the aircraft. Such structures must sometimes be opened to gain access to the drain valve. For example, the Boeing C-17 is equipped with recessed fuel drain valves normally housed behind closed doors. Other fuel drain valves are placed in small or difficult-to-access locations that complicate the use of defueling fittings, because standard fittings will not fit over the drain valve in the spacing provided.

Therefore, the present invention involves an aircraft defueling fitting and associated methods of defueling with features that facilitate defueling aircraft even in tight, recessed, and difficult-to-access spaces. The present invention more specifically involves a fitting that attaches to an aircraft body so that an actuator can be placed over the fuel drain valve. The actuator opens the fuel drain valve and allows fuel to drain from the associated fuel tank. The defueling fitting described herein can be used with any aircraft, including without limitation fixed wing aircraft (airplanes) and rotary wing aircraft (helicopters). Such aircraft are normally provided with one or more flush or recess-mounted fuel drains in the wings and/or fuselage.

As used throughout the specification and claims, the term "plate" is used broadly to mean any object, the thickness of which is relatively small or shallow in comparison with the other dimensions of the item. A "plate" can also include a cup, especially a suction cup. "Flange" is also used broadly to mean a rim or plate used to hold an object in place or attach it to another object. "Circumference" means at or near a boundary line of a figure, area, or object. The term "baffle" means a usually static device that regulates or limits the flow of a fluid. The term "hub" is used broadly to indicate a central part or a receiver of other parts. "Vacuum" means lower pressure than local atmospheric pressure. The words "including" and "having," as used in the specification, including the claims, have the same meaning as the word "comprising."

Figure 2:
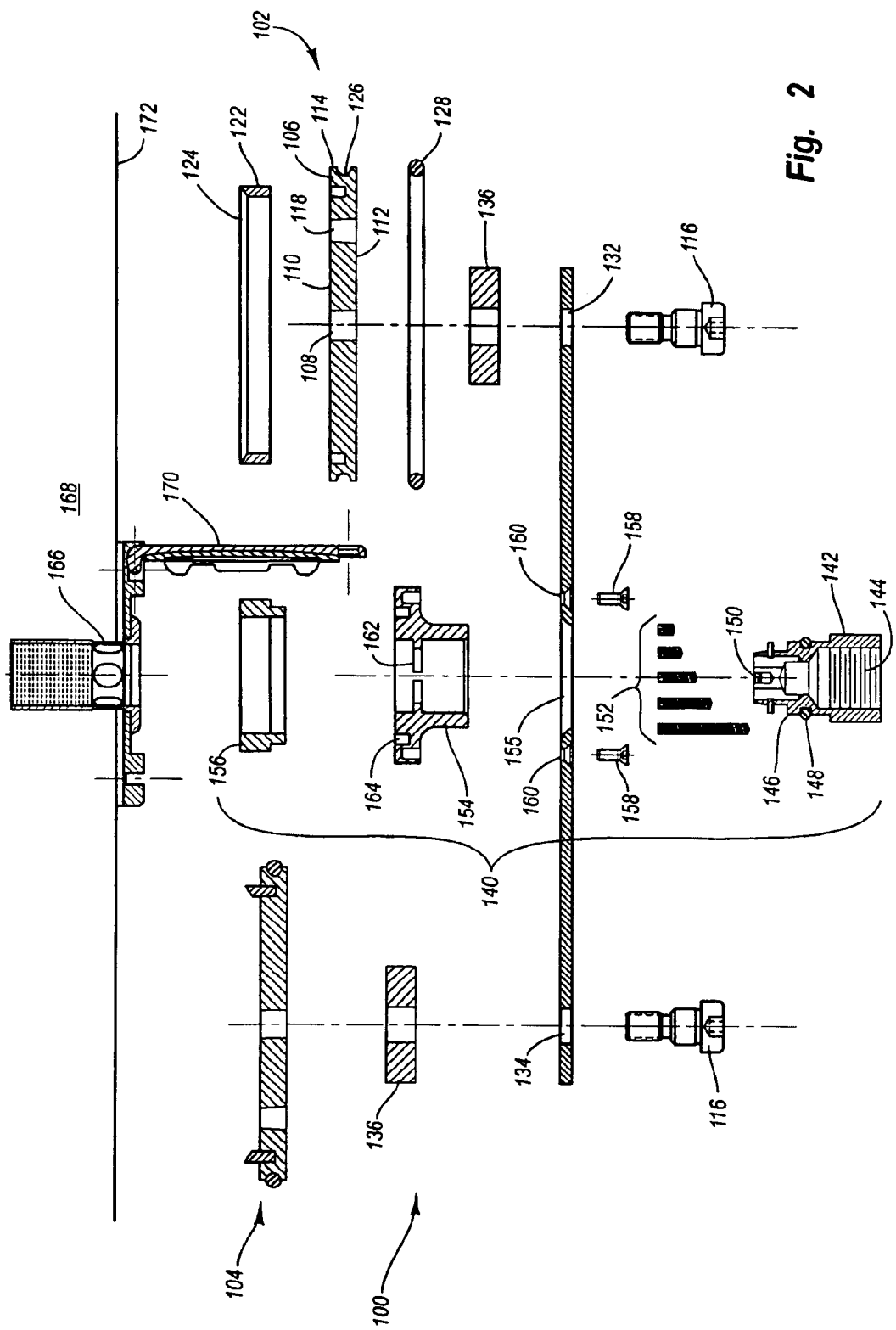
FIG. 2 is an exploded side view, partly in section, of the aircraft defueling fitting of FIG. 1, shown in relation to a fuel tank drain valve mounted to a surface on an aircraft.

Turning now to the figures, and in particular to FIGS. 1–2, an aircraft defueling fitting 100 is shown according to principles of the present invention. The aircraft defueling fitting includes first and second structural connectors, which, according to FIGS. 1–2, comprise a first suction cup 102 and a second suction cup 104. Each of the first and second suction cups 102, 104 comprises a plate 106 (FIG. 2). The plate 106 shown in FIG. 2 is a generally circular plate with a center 108, a first surface 110, a second surface 112, and a circumferential edge 114. According to the embodiment of FIGS. 1–2, the center 108 also defines a hole receptive of a fastener, for example a screw 116. The plate 106 may be made of structural material such as aluminum, according to some embodiments; however, other materials such as different types of rubbers, plastics, ceramics, or composites may also be used.

The plate 106 includes a second hole 118 spaced from the center 108, a groove or trough 120 in the first surface 110, and a seal disposed in the trough 120. The trough 120 is preferably circumferential and continuous, but not necessarily so. The second hole 118 of FIGS. 1–2 is a vacuum suction port that facilitates sealing the first surface 110 to an aircraft and prevents fluid leaks during aircraft defueling. According to FIGS. 1–2, the seal is a first elastomeric ring 122 and includes an exposed angled surface 124 seen most clearly in FIG. 1.

The circumferential edge 114 comprises a concave surface 126 according to the embodiment of FIGS. 1–2. A second elastomeric ring 128 fits snugly around the plate 106 against the concave surface 126.

The first and second suction cups 102, 104 are connected to one another via a mount 130 extending therebetween. The mount 130 of FIGS. 1–2 is a generally straight, elongated member comprised of structural materials such as aluminum. However, other suitable materials may also be used to construct the mount 130. The mount 130 includes first and second holes 132, 134 at opposing ends thereof, through which the screws 116 or other fastener extends. The screws 116 attach the suction cups 102, 104 to the mount 130. A gasket 136 may be disposed between the mount 130 and each of the suction cups 102, 104.

The aircraft defueling fitting 100 also includes an actuator assembly 140. The actuator assembly 140 of FIGS. 1–2 acts as a poppet valve opener and extends transversely from the mount 130. As mentioned above, most aircraft are equipped with poppet drain valves to facilitate defueling. The actuator assembly 140 opens fuel tank drain valves when the properly aligned therewith. Details of engagement between the actuator assembly (140) and a poppet fuel tank drain valve are shown and discussed below with reference to FIG. 3.

Referring again to FIG. 2, the actuator assembly 140 comprises a probe 142 with internal threading 144 and a tapered end 146. The tapered end 146 includes a circumferential O-ring 148 and a recess 150 receptive of inserts 152 of various lengths. The actuator assembly also includes a hub 154 receptive of the probe 142, and a hub gasket 156. The hub 154 is flanged to facilitate connection to the mount 130. Accordingly, one or more fasteners 158 may be inserted through holes 160 in the mount 130 to attach the hub 154 in an aperture 155 of the mount 130. When the actuator assembly 140 is fully assembled, the probe 142 is inserted at least partially into the hub (see FIG. 3). The O-ring 148 seals an area or annulus between the hub 154 and the probe 142. An internal baffle 162 of the hub 154 limits insertion of the probe into the hub 154. However, one of the pin inserts 152 extends through the baffle 162 and through the hub 154. The hub 154 includes a recess 164 receptive of the hub gasket 156. The hub gasket 156 is preferably made of rubber or other sealing material.

When the aircraft defueler fitting 100 is fully assembled, it may be used to effectively defuel an aircraft, including aircraft with covered and recessed fuel tank drain valves such as a poppet valve 166 shown in FIGS. 2–3. As shown in FIG. 2, some aircraft, such as the Boeing C-17 aircraft 168 shown, include an openable door 170 that covers and houses the poppet valve 166. However, the actuator assembly 140 may be sized appropriately and fitted with one of the pin inserts 152 such that when the suction cups 102, 104 are connected to and seal against an outer surface 172 of the aircraft 168, the poppet valve 166 is forced open by the insert 152 as shown in FIG. 3.

One or more fluid passageways 174 through the actuator assembly 140 are open to a connection hose 176 and in fluid communication with the poppet valve 166. Therefore, when the poppet valve 166 is opened, fuel in the aircraft 168 is drained to a storage/vacuum assembly 178 which provides both a vacuum source and a holding tank. The suction cups 102, 104 and the actuator assembly 140 are operatively connected to a vacuum 179 provided by the storage/vacuum assembly 178. The vacuum 179 creates a pressure differential to seal the suction cups 102, 104 against the surface of the aircraft. The vacuum 179 may also provide suction to the actuator assembly 140 for increased drain flow rates. Those skilled in the art will understand, however, that the vacuum 179 supplied to the suction cups 102, 104 and the actuator assembly 140 may be supplied by one or more vacuum generators, and that the vacuums 179 to each of the suction cups 102, 104 and the actuator assembly 140 may be independent or provided by a single source. The small actuator assembly 140 flanked by the suction cups 102, 104 allows easy and convenient access to tight or small areas, or recessed structures about an aircraft fuel drain valve (such as the ones associated with a Boeing C-17).

Figure 4:
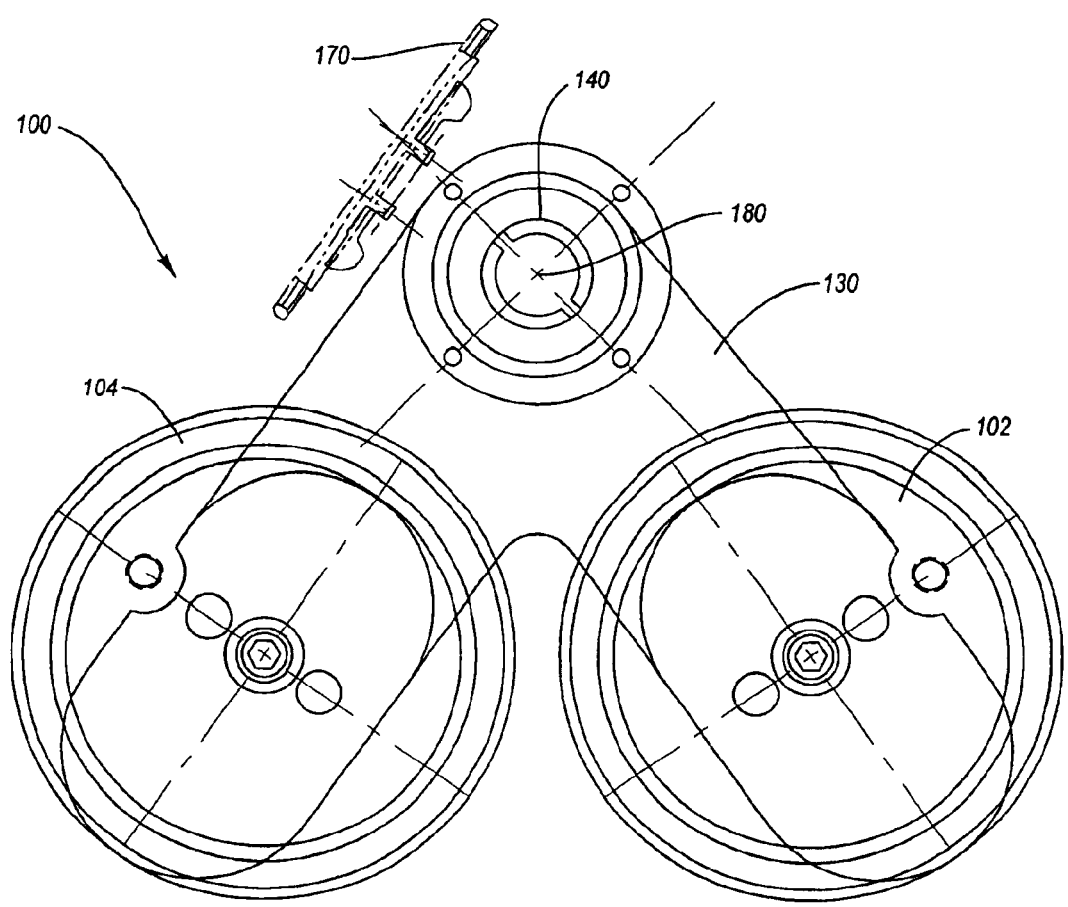
FIG. 4 is a bottom view of an alternative embodiment of an aircraft defueling apparatus according to the present invention.
Figure 5:
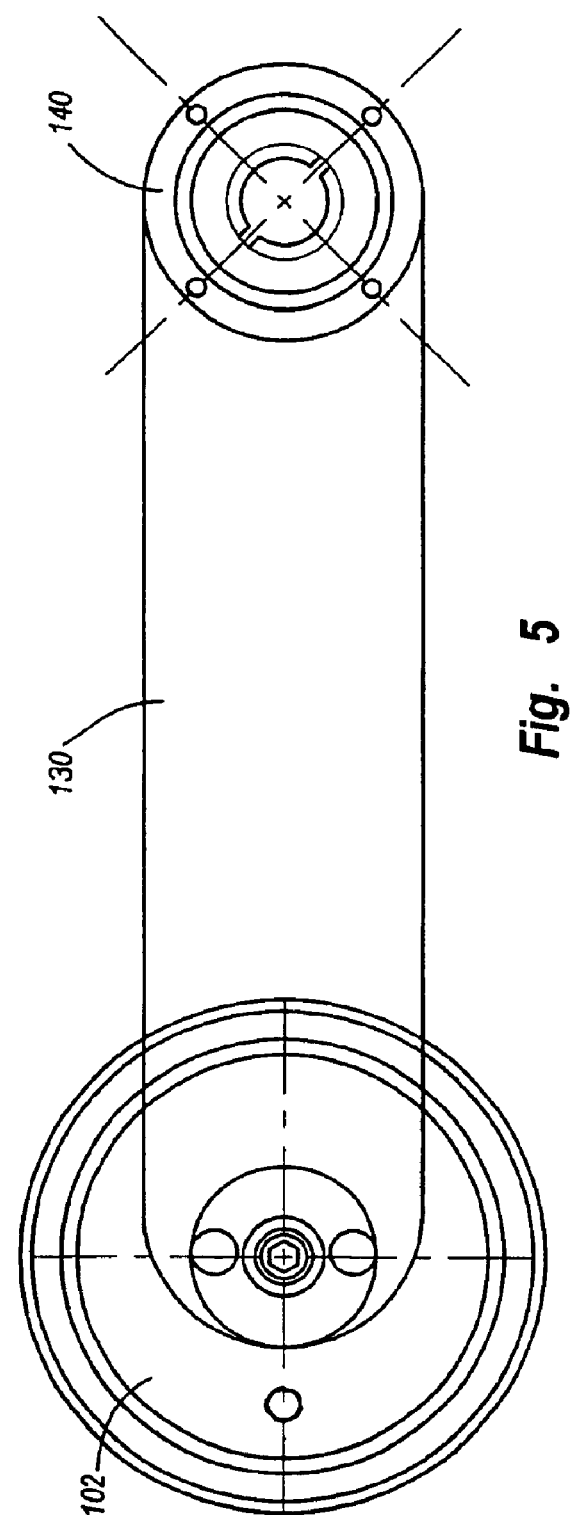
FIG. 5 is a bottom view of an alternative embodiment of an aircraft defueling apparatus according to the present invention.

While the aircraft defueler fitting 100 is shown with two suction cups 102, 104 and a generally straight mount 130, other configurations are also contemplated and within the scope of the present invention. For example, with reference to FIG. 4, an alternate configuration for the defueler fitting 100 is shown. According to the embodiment of FIG. 4, the mount 130 is angled, with the actuator assembly 140 connected to the mount 130 at a vertex 180 of the generally V-shaped mount 130. The actuator assembly 140 and the suction cups 102, 104 may remain, however, similar or identical to the assembly shown in FIGS. 1–3. Other configurations, including configurations with only one suction cup 102 (FIG. 5) or more than two suction cups 102, 104 are also contemplated by the present invention. Furthermore, the mount 130 may be made of various shapes, including without limitation shapes that are round, polygonal, or any other suitable configuration. Accordingly, an aircraft fuel tank may be defueled by providing a defueling fitting according to principles described herein, and depressing an aircraft fuel drain valve, such as the poppet valve 166 shown in FIG. 3. Thus, leaks of any aircraft fuel are reduced or eliminated by the various gaskets, seals, and fittings of the defueler fitting 100 and all draining fuel is directed through the hose 176.

For some particular aircraft, such as the Boeing C-17 aircraft 168 (FIGS. 2–3), defueling may include the steps of opening the fuel valve door 170, attaching the two suction cups 102, 104 to the aircraft 168 adjacent to fuel valve door 170, and depressing the poppet valve 166 with the actuator assembly 140 of defueler fitting 100. The actuator assembly may need to be aligned with the poppet valve 166 for proper operation.

While this invention has been described with reference to certain specific embodiments and examples, it will be recognized by those skilled in the art that many variations are possible without departing from the scope and spirit of this invention. The invention, as described by the claims, is intended to cover all changes and modifications of the invention which do not depart from the scope of the invention.

What is claimed is:

1. An aircraft defueling fitting, comprising:
   first and second structural connectors, each of the first and second structural connectors having a first surface and a second surface;
   a circumferential seal disposed in the first surface of each of the first and second structural connectors;
   a mount extending between and connecting the first and second structural connectors;
   an actuator assembly disposed in the mount for opening an aircraft poppet valve.

2. An aircraft defueling fitting, comprising:
   first and second structural connectors, each of the first and second structural connectors having a first surface and a second surface;
   a circumferential seal disposed in the first surface of each of the first and second structural connectors;
   a mount extending between and connecting the first and second structural connectors;
   an actuator assembly disposed in the mount for opening an aircraft poppet valve;
   a vacuum port disposed in each of the first and second structural connectors.

3. An aircraft defueling fitting according to claim 2 wherein each of the vacuum ports is operatively connected to a vacuum source at the second surface.

4. An aircraft defueling fitting according to claim 1, further comprising one or more fluid passages through the actuator assembly.

5. An aircraft defueling fitting according to claim 4 wherein the one or more fluid passages are in fluid communication with a vacuum source and a holding tank.

6. An aircraft defueling fitting according to claim 1 wherein the actuator assembly comprises a probe, a hub receptive of the probe, and a hub gasket.

7. An aircraft defueling fitting according to claim 6, further comprising an O-ring disposed around an end of the probe for sealing between the probe and the hub.

8. An aircraft defueling fitting according to claim 7, further comprising a baffle internal to the hub.

9. An aircraft defueling fitting according to claim 6, further comprising a removable insert disposed in the probe and extending through the baffle of the hub and through the hub gasket.

10. An aircraft defueling fitting, comprising:
    first and second structural connectors, each of the first and second structural connectors having a first surface and a second surface;
    a circumferential seal disposed in the first surface of each of the first and second structural connectors;
    a mount extending between and connecting the first and second structural connectors;
    an actuator assembly disposed in the mount for opening an aircraft poppet valve;
    wherein the first and second structural connectors comprise suction cups.

11. An aircraft defueling fitting, comprising:
    first and second structural connectors, each of the first and second structural connectors having a first surface and a second surface;
    a circumferential seal disposed in the first surface of each of the first and second structural connectors;
    a mount extending between and connecting the first and second structural connectors;
    an actuator assembly disposed in the mount for opening an aircraft poppet valve;
    wherein the suction cups and the mount comprise aluminum.

12. An aircraft defueling fitting according to claim 1 wherein the actuator is sized to open a recessed fuel tank poppet valve of an aircraft.

13. An aircraft defueling fitting, comprising:
    first and second structural connectors, each of the first and second structural connectors having a first surface and a second surface;
    a circumferential seal disposed in the first surface of each of the first and second structural connectors;
    a mount extending between and connecting the first and second structural connectors;
    an actuator assembly disposed in the mount for opening an aircraft poppet valve;
    wherein the actuator is sized to open a fuel tank poppet valve of a Boeing C-17 aircraft when the first surfaces of the first and second structural connectors bear against a wing of the Boeing C-17.

14. An aircraft defueling fitting according to claim 1 wherein the mount is substantially straight.

15. An aircraft defueling fitting, comprising:
    first and second structural connectors, each of the first and second structural connectors having a first surface and a second surface;
    a circumferential seal disposed in the first surface of each of the first and second structural connectors;
    a mount extending between and connecting the first and second structural connectors;
    an actuator assembly disposed in the mount for opening an aircraft poppet valve;
    wherein the mount is substantially V-shaped.

16. An aircraft defueling fitting, comprising:
    an elongated mount having first and second ends;
    a first suction cup attached to the first end of the elongated mount and a second suction cup attached to the second end of the elongated mount;

a poppet valve opener attached to the elongated mount between the first and second ends.

17. An aircraft defueling fitting according to claim 16 wherein the elongated mount comprises an aperture, the poppet valve opener disposed in the aperture.

18. An aircraft defueling fitting according to claim 16 wherein the poppet valve opener comprises:
   a flanged hub having an internal passageway therethrough and an external trough;
   a probe inserted at least partially into the flanged hub;
   a hub gasket at least partially inserted into the external trough.

19. An aircraft defueling fitting according to claim 18, further comprising a removable insert of variable length disposed in the probe and extending through the flanged hub.

20. An aircraft defueling fitting according to claim 16 wherein each of the first and second suction cups comprises:
   a generally circular plate having a center, a first surface, a second surface, and a circumferential edge;
   a hole in the generally circular plate spaced from the center;
   a trough disposed in the first surface;
   a seal disposed in the trough.

21. An aircraft defueling fitting according to claim 20 wherein the circumferential edge comprises a concave surface, wherein an elastomeric ring is disposed around the circumferential edge against the concave surface.

22. An aircraft defueling fitting according to claim 20 wherein the hole comprises a vacuum suction port for sealing the first and second suction cups to an aircraft.

23. An aircraft defueling fitting according to claim 22 wherein the vacuum suction port is operatively connected to a vacuum source.

24. An aircraft defueling fitting according to claim 16 wherein the poppet valve opener comprises at least one fluid communication path therethrough.

25. An aircraft defueling fitting according to claim 16 wherein the poppet valve opener extends from the elongated mount such that the opener opens a recessed fuel valve of a Boeing C-17 aircraft when the first and second suction cups are sealed against a surface of the C-17 aircraft adjacent to the recessed fuel valve.

26. A defueling fitting for an aircraft, comprising:
   a mount having first and second ends;
   a first suction cup attached to the first end of the mount and a second suction cup attached to the second end of the mount;
   a fuel valve opener attached to the mount between the first and second ends;
   wherein the fuel valve opener extends transversely from the mount such that it reaches beyond and opens a fuel valve disposed behind an openable door of the Boeing C-17.

27. A defueling fitting for an aircraft according to claim 26 wherein each of the first and second suction cups comprises an aluminum plate with a vacuum port disposed therein.

28. An aircraft defueling fitting, comprising:
   an angled mount having first and second ends;
   a first connector attached to the first end of the angled mount and a second connector attached to a second end of the angled mount;
   a valve actuator assembly attached to the angled mount between the first and second ends adapted to open an aircraft fuel tank drain valve.

29. An aircraft defueling fitting, comprising:
   an angled mount having first and second ends;
   a first connector attached to the first end of the angled mount and a second connector attached to a second end of the angled mount;
   a valve actuator assembly attached to the angled mount between the first and second ends adapted to open an aircraft fuel tank drain valve;
   wherein the angled mount comprises a general V-shape, and the actuator assembly is attached at a vertex of the general V-shape.

30. An aircraft defueling fitting, comprising:
   an angled mount having first and second ends;
   a first connector attached to the first end of the angled mount and a second connector attached to a second end of the angled mount;
   a valve actuator assembly attached to the angled mount between the first and second ends adapted to open an aircraft fuel tank drain valve;
   wherein each of the first and second connectors comprises:
      a plate having a first surface, a second surface, and a circumferential edge;
      a hole in the plate;
      a continuous trough disposed in the first surface;
      a seal disposed in the trough.

31. An aircraft defueling fitting according to claim 30 wherein the circumferential edge comprises a concave surface, wherein an elastomeric ring is disposed around the circumferential edge against the concave surface.

32. An aircraft defueling fitting according to claim 30 wherein the hole comprises a vacuum suction port for attaching the first and second connectors to an aircraft.

33. An aircraft defueling fitting according to claim 32 wherein the vacuum suction port is operatively connected to a vacuum source.

34. An aircraft defueling fitting according to claim 28 wherein the valve actuator assembly extends from the angled mount such that the valve actuator opens the fuel tank drain valve of a Boeing C-17 aircraft when the first and second connectors are attached to a surface of the C-17 aircraft adjacent to the fuel tank drain valve.

35. An aircraft defueling fitting, comprising:
   a mount;
   a suction cup attached to the mount;
   a poppet valve opener separate and spaced laterally from the first suction cup attached to the mount.

36. An aircraft defueling fitting according to claim 35 wherein the poppet valve opener comprises a flanged hub having an internal passageway therethrough and an external trough, a probe inserted at least partially into the flanged hub, and a hub gasket at least partially inserted into the external trough.

37. An aircraft defueling fitting according to claim 36, further comprising a removable insert of variable length disposed in the probe and extending through the flanged hub.

38. An aircraft defueling fitting according to claim 36 wherein the suction cup comprises:
   a rigid plate having a center, a first surface, a second surface, and a circumferential edge;
   a hole in the generally circular plate spaced from the center;
   a trough disposed in the first surface;
   a seal disposed in the trough.

39. An aircraft defueling fitting, comprising:

a mount;

a suction cup attached to the mount;

a poppet valve opener separate from the first suction cup attached to the mount;

wherein the poppet valve opener comprises a flanged hub having an internal passageway therethrough and an external trough, a probe inserted at least partially into the flanged hub, and a hub gasket at least partially inserted into the external trough;

wherein the suction cup comprises:
- a rigid plate having a center, a first surface, a second surface, and a circumferential edge;
- a hole in the generally circular plate spaced from the center;
- a trough disposed in the first surface;
- a seal disposed in the trough;

at least one additional suction cup attached to the mount.

40. An aircraft defueling fitting, comprising:

a first structural connector at a first location and a second structural connector spaced laterally from the first structural connector at a second location, each of the first and second structural connectors having a first surface and a second surface;

a circumferential seal disposed in the first surface of each of the first and second structural connectors;

a mount extending between and connecting the first and second structural connectors;

an actuator assembly coupled to the mount for opening an aircraft poppet valve.

* * * * *